Aug. 25, 1936.   L. E. LA BRIE   2,051,867

BRAKE

Original Filed July 25, 1930

INVENTOR.
LUDGER E. LA BRIE
BY
ATTORNEY

Patented Aug. 25, 1936

2,051,867

UNITED STATES PATENT OFFICE 2,051,867

BRAKE

Ludger E. La Brie, South Bend, Ind., assignor to Bendix Brake Company, South Bend, Ind., a corporation of Illinois Original application July 25, 1930, Serial No. 470,577. Divided and this application December 20, 1934, Serial No. 758,424

12 Claims. (Cl. 188—79.5)

This invention relates to brakes, and is illustrated as embodied in a double wrapping two shoe brake of the internal expanding type which is particularly adapted for the front wheel of an automobile in a four wheel braking system.

An object of the invention is to provide a simple but effective adjusting means for the friction element or elements of the brake, to increase the over-all length thereof to compensate for lining wear.

In one desirable arrangement, a thrust member such as a connecting bolt carries a part (shown as an adjustable nut), engaging a part pivotally in engagement with the shoe end. Preferably the thrust member is formed with a slot embracing the end of the shoe web, and the pivotal part is a stamping arranged in the slot and shaped generally as a semicircular device seated in a corresponding socket in the end of the shoe web.

Figure 1:
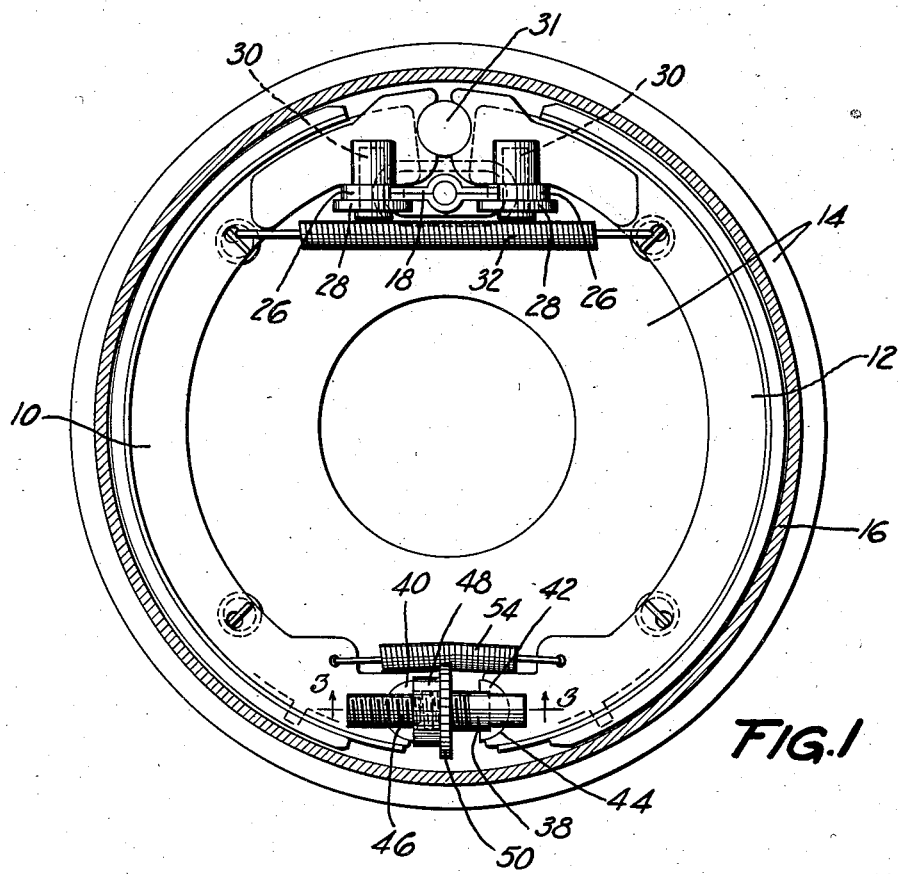
Figures 2, 3:
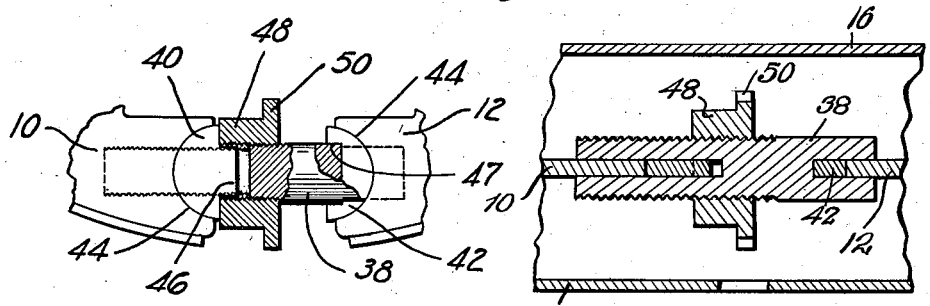

Other objects and meritorious features of the invention including particular elements, subcombinations and combinations of parts will become apparent from the following detailed description of a preferred embodiment thereof shown in the accompanying drawing, in which:

Figure 1 is a vertical section through the brake, just inside the head of the brake drum, and showing the brake shoes in side elevation;

Figure 2 discloses a detail and partly in section the adjusting means for the elements of the brake; and Figure 3 is a partial section on the line 3—3 of Figure 1.

Referring now to Figure 1, there are shown similar interchangeable T section brake shoe elements 10 and 12 mounted upon the usual brake support plate 14 and within the conventional rotatable brake drum 16. The brake shoes are preferably articulated by my novel adjustable connecting means described below, and may be spread apart into drum engagement by expanding mechanism located at the top of the brake. This applying or expanding mechanism preferably comprises a two-part wedge member 18 which parts are formed for attachment to a flexible brake operating cable suitably connected to transmission elements to be operated by the service pedal.

The wedge applying member 18 preferably contacts the upper and smaller of two juxtaposed rollers 26 and 28 rotatably mounted on a shaft 30 carried by the reinforced recessed ends of the friction element or elements of the brake. The larger of the rollers 28 is preferably positioned in engagement with the brake support plate 14 to position the brake laterally and guide the same during its applying movement.

An anchor member 31, preferably cylindrical, is positioned within the recessed portions in the reinforcements at the end of the brake elements and also above the wedge operating element 18 which latter element bridges the ends of the friction members. A return spring 32 is preferably secured to the ends of the friction elements to draw the same into engagement with the anchor and also to facilitate the return of the wedge applying means 18 to inoperative position.

The brake as so far described is claimed in my application No. 470,577, filed July 25, 1930, the present application being a division thereof.

The present application relates to a novel form of adjusting mechanism for the elements of the brake, said mechanism being disclosed in detail in Figure 2. This adjusting mechanism in the illustrated form comprises an externally threaded connecting thrust element or connecting bolt 38 bifurcated or otherwise formed with slots at its ends to embrace the ends of the shoe webs. This adjusting member also embraces between its end furcations, i. e., in the slots, segments 40 and 42 (preferably semi-circular stampings) seated within correspondingly curved recesses 44 in the ends of the shoe webs and shown as stamped out entirely therethrough.

The segment 40 is further preferably provided with a projection 46 to interlock it with the nut 48 described below, and the segment 42 is preferably recessed on its flat side to provide shoulders 47 overlying the exterior surface of the adjusting member and interlocking it therewith.

A nut or other adjustable thrust member 48 is threadedly mounted on the adjusting element which nut preferably abuts at its end the segment 40. The nut is also preferably provided with teeth 50 positioned opposite an opening in the brake support plate 14, which opening is adapted to receive a tool to be engaged with the teeth to turn the nut, effecting the adjusting operation.

Rotation of the nut by the tool (not shown) serves to move the segment 40 relatively to the member 38 thereby moving the friction elements apart to increase the over-all length of the brake and compensate for lining wear. The segments 40 and 42 fitting within the circular recesses of the webs of the friction elements permit the necessary rocking movement of the parts during the application of the brake. A return spring 54 secured to each of the friction elements serves to maintain the parts of the adjusting mechanism in close contact.

While I have illustrated and described somewhat in detail one embodiment of my invention, it is not my intention to limit the scope of the invention to this particular embodiment or otherwise than by the terms of the appended claims.

I claim:

1. Adjusting mechanism, for an internal expanding brake having a plurality of spaced apart friction elements, comprising a thrust element mounted on and between the ends of said friction elements, means mounted within said thrust element engaging one of the spaced apart ends of the friction element and a nut threadedly received by the thrust element in abutting engagement with said means.

2. Adjusting mechanism for the friction means of a brake, said friction means comprising a plurality of spaced apart elements, a thrust member mounted on and positioned between the ends of said elements, means mounted on said thrust member having swivelled contact with one end of one of said elements, and a nut threadedly mounted on the thrust element in abutting engagement with said means.

3. Adjusting mechanism for the spaced apart ends of friction elements of a brake structure, comprising an adjusting element bifurcated at its ends to receive the spaced ends of the friction elements, thrust receiving segments positioned between the furcations of said adjusting element, said segments disconnectedly engaging the ends of said friction elements, together with a nut threaded on said adjusting element, said nut being in abutting engagement with one of said segments.

4. A brake comprising shoes having webs, an adjustment connecting the shoes including a member having end slots embracing the web ends, and thrust parts movably engaging the web ends and seated in said slots.

5. A brake comprising a shoe having a web, an adjustment for the shoe including a member having an end slot embracing the web end, and a thrust part movably engaging the web end and seated in said slot.

6. A brake comprising shoes having webs formed with semicircular recesses extending therethrough at their ends, adjusting means connecting the shoes and having slots closely embracing the web ends, and semicircular parts of substantially the thickness of said webs arranged in said slots and seated in said recesses.

7. A brake comprising a shoe having a web formed with a semicircular recess extending therethrough at its end, adjusting means for the shoe and having a slot closely embracing the web end, and a semicircular part of substantially the thickness of said web arranged in said slot and seated in said recess.

8. A brake comprising shoes having webs formed with semicircular recesses extending therethrough at their ends, adjusting means connecting the shoes and having slots closely embracing the web ends, and semicircular parts of substantially the thickness of said webs arranged in said slots and seated in said recesses, together with a thrust member adjustable toward and from one of the shoe ends and engaging the corresponding semicircular part.

9. A brake comprising a shoe having a web formed with a semicircular recess extending therethrough at its end, adjusting means for the shoe and having a slot closely embracing the web end, and a semicircular part of substantially the thickness of said web arranged in said slot and seated in said recess, together with a thrust member adjustable toward and from the shoe end and engaging the semicircular part.

10. A brake adjustment comprising an externally threaded bolt having a nut threaded thereon and formed with slots at its ends, and thrust parts arranged in said slots and one of which is engaged by said nut.

11. A brake adjustment comprising an externally threaded bolt having a nut threaded thereon and formed with slots at its ends, and thrust parts arranged in said slots and one of which is engaged by said nut, the bolt and the other of the thrust parts being interlocked with each other.

12. A brake adjustment comprising an externally threaded bolt having a nut threaded thereon and formed with slots at its ends, and thrust parts arranged in said slots and one of which is engaged by said nut, said parts being generally of semicircular outline with their flat sides facing each other.

LUDGER E. LA BRIE.